(No Model.)
M. W. WILLIAMS.
ARTIFICIAL TOOTH.
No. 317,259. Patented May 5, 1885.
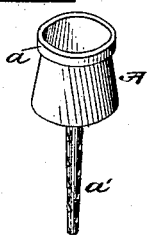
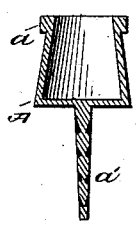  
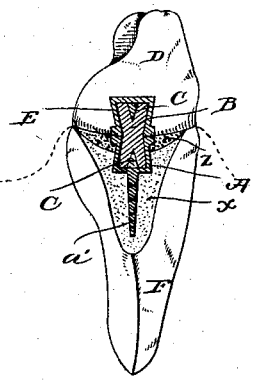
WITNESSES
C. W. Dashiell
Edw. G. Siggers
INVENTOR
M. W. Williams
By his Attorneys
C. A. Snow & Co.

UNITED STATES PATENT OFFICE.

MARION WILLIAM WILLIAMS, OF HOPKINSVILLE, KENTUCKY.

ARTIFICIAL TOOTH.

SPECIFICATION forming part of Letters Patent No. 317,259, dated May 5, 1885.

Application filed February 24, 1885. (No model.)

*To all whom it may concern:*

Be it known that I, MARION W. WILLIAMS, a citizen of the United States, residing at Hopkinsville, in the county of Christian and State of Kentucky, have invented a new and useful Improvement in Devices for Securing Artifical Teeth, &c., of which the following is a specification, reference being had to the accompanying drawings.

My invention relates to an improvement in devices for securing artificial crown-teeth to natural roots in the mouth; and it consists in the peculiar construction and combination of parts that will be more fully set forth hereinafter, and particularly pointed out in the claims.

In the accompanying drawings, Figure 1 is perspective view of the cup for the root of the tooth and having the depending shank secured thereto. Fig. 2 is a vertical sectional view of the same. Fig. 3 is a detailed elevation of the securing-pin and wedges. Fig. 4 is a plan view showing the shape of the cups. Fig. 5 is a sectional view of a crown-tooth attached to a root by means of my improved devices.

A represents a cup that is elliptically-shaped in plan view, and is larger at its lower end than at its upper edge, as shown. A shouldered rim, $a$, is formed around the upper edge of the cup, on its outer side, and a notched shank, $a'$, depends from the center of the bottom of the cup.

B represents a pin, which corresponds in size and shape to the interior diameter of the cup A, and has slits $b$ cut in its upper and lower ends to receive the wedges C. These wedges are made of steel, and the cup and pin and shank are preferably made of platinum.

D represents an artificial crown of a tooth, in which is molded a cap, E, that is similar to the cap A, and is secured in the crown in an inverted position.

F represents a natural root of a tooth to which the artificial crown is to be applied.

The operation of securing the crown to the root is as follows: The root is first cut down to a level with the gum and the canal is enlarged for a suitable depth, so as to enable the cup A and its shank to be placed therein, the upper edge of the cup being slightly below the level of the upper end of the root. The pin is then placed in the cup in the crown without the wedges, and the crown is placed upon the natural root, the lower end of the pin entering the cup A in the root. The patient then closes his mouth, which articulates the crown to the root and will enable the dentist to discover where to grind the root or crown to approximate a joint at union. The crown, pin, and cup are then removed and the canal in the root is filled about two-thirds full of a reliable cement. The crown, pin, and cup are then readjusted in the root and the patient closes his mouth, which retains the crown in position until the cement hardens. The crown is then withdrawn, leaving the pin in the cup A, and the cement is trimmed down around the cup about two-thirds of its depth. The cement is shown at $x$, Fig. 5. The space thus made around the cup at the upper end of the root is packed with a good alloy—gold or amalgam—allowing it to spread all over the end of the root, as at Z, Fig. 5. The pin is then removed from the cup A, the wedges C are started in the slits in the pin, and the pin is inserted in the cups of the crown and root. When the crown is forced down upon the root, the wedges are driven into the slits and expand the ends of the pin and cause them to exactly fill the cups, and as these cups are smaller at their meeting edges than they are at their ends it will be readily understood that the crown is secured to the root so firmly that there will be no danger of its ever becoming displaced. Owing to the elliptical shape of the cups, the crown will be effectually prevented from turning on the root.

By the use of my improved devices I am enabled to make the connecting-pins much larger than those now in common use, and thus overcome the annoyance of having the pin break at the connecting-point, as is now of frequent occurrence.

By molding the cup in the crown the crown is rendered very strong, and is secured against the danger of breaking, and by covering the cement with the amalgam at the upper end of the root the root is protected against further decay.

Having thus described my invention, I claim—

1. The crown having the cup molded or secured therein, in combination with the cup having the depending shank adapted to be inserted in the natural root, the cups being formed smaller at their connecting edges than they are at their ends, and the slitted pin and wedges for securing the cups together, substantially as described.

2. The combination of the cups, the wedges, and the slitted pin for securing the cups together, said cups being smaller at their meeting edges than at their ends, and elliptical or formed in some shape other than round to prevent turning, substantially as described.

3. The combination of the cups with the slitted pin and the wedges, the cups being formed smaller at their connecting-edges than they are at their ends, and provided with rims projecting outwardly beyond their outer edges, substantially as described.

In testimony that I claim the foregoing as my own I have hereto affixed my signature in presence of two witnesses.

MARION WILLIAM WILLIAMS.

Witnesses:
PALMER GRAVES,
J. E. McPHERSON.